E. S. HERRINGTON.

Improvement in Harrows.

No. 120,873.  Patented Nov. 14, 1871.

UNITED STATES PATENT OFFICE.

ELIAL S. HERRINGTON, OF EMMETT, OHIO.

IMPROVEMENT IN HARROWS.

Specification forming part of Letters Patent No. 120,873, dated November 14, 1871.

*To all whom it may concern:*

Be it known that I, ELIAL S. HERRINGTON, of Emmett, in the county of Paulding and State of Ohio, have invented a new and useful Improvement in Combined Harrow and Leveler; and I do hereby declare that the following is a full, clear, and exact description thereof, which will enable others skilled in the art to make and use the same, reference being had to the accompanying drawing forming part of this specification.

Figure 1:
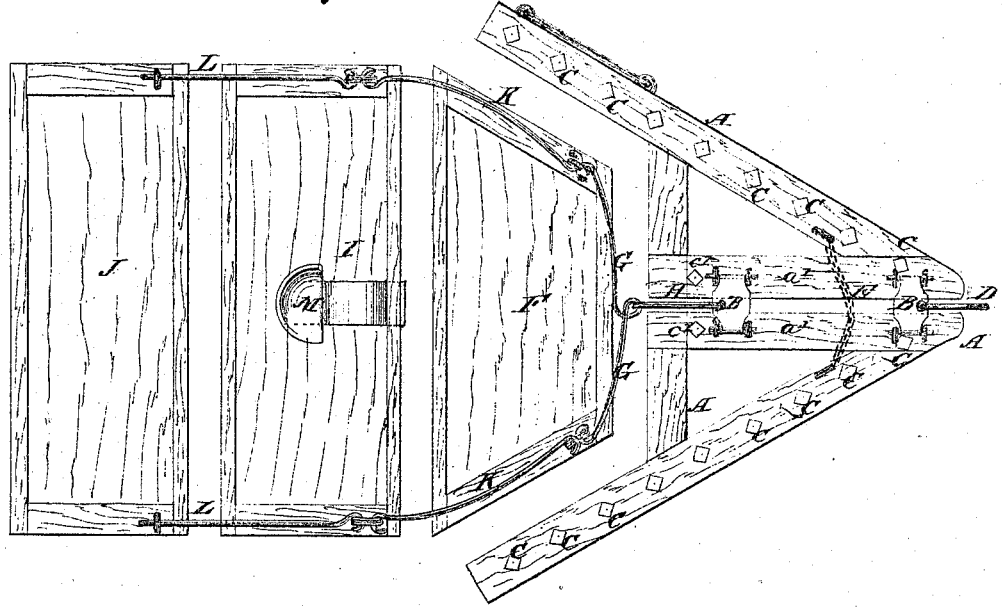
Figure 2:
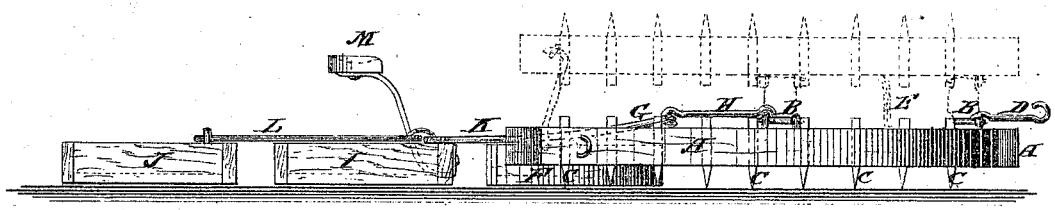

Figure 1 is a top view of my improved machine. Fig. 2 is a side view of the same.

My invention has for its object to furnish an improved machine for harrowing the ground, breaking up the lumps and clods and leveling off the ground, leaving it light, smooth, and level; and it consists in the construction and combination of various parts, as hereinafter more fully described.

A is the harrow-frame, which is made triangular in form and in two equal parts, which are hinged to each other at the forward and rear parts of the central short longitudinal or line bars $a'$ by double-jointed hinges B. This construction enables the two parts of the frame A to be turned into a vertical position, so that it may be drawn upon the central bars $a'$ when passing from place to place, or whenever it is desired that the harrow should not operate upon the ground. C are the harrow-teeth, which are attached to the frame A in the ordinary manner, except that the two teeth $c'$ that are attached to the rear parts of the central or line bars $a'$ are made longer than the other teeth, to take a firmer hold upon the ground. The draft may be attached to the forward hinge B by a short hooked rod, D, or to the forward part of the frame A by a short branched chain, E. F is a box, open upon its upper side, and the ends of which are made inclined, as shown in Fig. 1, so that it may fit into the space between the rear parts of the inclined or outer side bars of the frame A. To the forward parts of the ends of the box F are pivoted the ends of a bail, G, the middle part of which is connected with the rear hinge B, or with the rear part of the harrow-frame A, by a short rod or chain, H. I J are two boxes placed in the rear of the box F, the ends of the forward one, I, of which are connected with the ends of the said box F by short rods or chains K, and the ends of the rear one, J, of which are connected with the ends of the other one, I, by short rods L. To one of the boxes F, I, J, preferably the middle one, is attached a seat, M, for the driver. If desired, the boxes F, I, J may be weighted with stones or other heavy material when additional weight may be required for breaking the clods and leveling the ground.

Having thus described my invention, I claim as new and desire to secure by Letters Patent—

1. The combination of a harrow and leveling boxes F I J with each other, substantially as herein shown and described, and for the purpose set forth.

ELIAL S. HERRINGTON.

Witnesses:
JOSHUA P. OTTLEY,
J. P. BUFFINGTON.